(12) United States Patent
Yao et al.

(10) Patent No.: US 8,635,664 B2
(45) Date of Patent: Jan. 21, 2014

(54) METHOD AND SYSTEM FOR SECURING APPLICATION PROGRAM INTERFACES IN UNIFIED EXTENSIBLE FIRMWARE INTERFACE

(75) Inventors: Jiewen Yao, Shanghai (CN); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1396 days.

(21) Appl. No.: 11/966,140

(22) Filed: Dec. 28, 2007

(65) Prior Publication Data

US 2009/0172797 A1    Jul. 2, 2009

(51) Int. Cl.
*H04L 29/06*    (2006.01)

(52) U.S. Cl.
USPC ......... 726/2; 726/7; 726/26; 726/27; 713/170

(58) Field of Classification Search
USPC ............................................................ 726/2
See application file for complete search history.

(56) References Cited

U.S. PATENT DOCUMENTS

| | | | | |
|---|---|---|---|---|
| 6,088,805 | A * | 7/2000 | Davis et al. | 726/10 |
| 7,248,691 | B1 * | 7/2007 | Pandit et al. | 380/28 |
| 7,401,235 | B2 * | 7/2008 | Mowers et al. | 726/2 |
| 2005/0278775 | A1 * | 12/2005 | Ross | 726/2 |

OTHER PUBLICATIONS

"What Are Access Tokens?"; Microsoft Corporation; Mar. 28, 2003.*
"vol. 5: Platform Initialization Specification Standards" Version 1.0, Unified EFI, Inc. Aug. 21, 2006.*
"UEFI Overview"; Tim Lewis, Jun. 6, 2007.*
"Black Hat". (2007) Retrieved from www.blackhat.com/html/bh-usa-07-speakers.html. pp. 1-91.
Besson, Frederic et al., "From Stack Inspection to Access Control: A Security Analysis for Libraries". (Jun. 28-30, 2004). Retrieved from http://research.microsoft.com/~adg/Publications/a_security_analysis_for_libraries_csfw04.ps . pp. 1-15.
Tolentino, Matthew E., "Linux in a Brave New Firmware Environment" (2003). Retrieved from www.inuxsymposium.org/2003/view_abstract.php?talk=188 . 1 Page.

* cited by examiner

*Primary Examiner* — Mohammad L Rahman
(74) *Attorney, Agent, or Firm* — Schwabe, Williamson & Wyatt, P.C.

(57) ABSTRACT

A method and system for securing an unified extensible firmware interface application program interface includes establishing a software hook for the application program interface during a pre-boot phase of a computing device and granting or denying access to the application program interface based on a comparison of a user token, which identifies the user, and an access control entry of an access control list associated with the application program interface.

18 Claims, 3 Drawing Sheets

METHOD AND SYSTEM FOR SECURING APPLICATION PROGRAM INTERFACES IN UNIFIED EXTENSIBLE FIRMWARE INTERFACE

BACKGROUND

The *UEFI Specification version* 2.1, published Jan. 23, 2007 specifies a Unified Extensible Firmware Interface (UEFI) that provides a software interface between an operating system (OS) and platform firmware of a computing device. The interface defined by the UEFI specification includes data tables which contain platform information, and boot and runtime services which are available to the operating system (OS) loader and the operating system. The UEFI defines boot services, which include text and graphical console support on various devices, bus, block and file services, and runtime services, such as date, time and NVRAM services. Moreover, *UEFI Platform Initialization Specification (PI) Version* 1.0—released Oct. 31, 2006, defines the firmware interface for chipset initialization.

The open format of the Unified Extensible Firmware Interface allows platform supplier, driver authors, and other software suppliers to create application program interfaces or "protocols" for use with the Unified Extensible Firmware Interface. However, the "extensibility" of the Unified Extensible Firmware Interface also creates a larger attack surface and opportunity for the injection of malware into the platform through unprotected application program interfaces.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
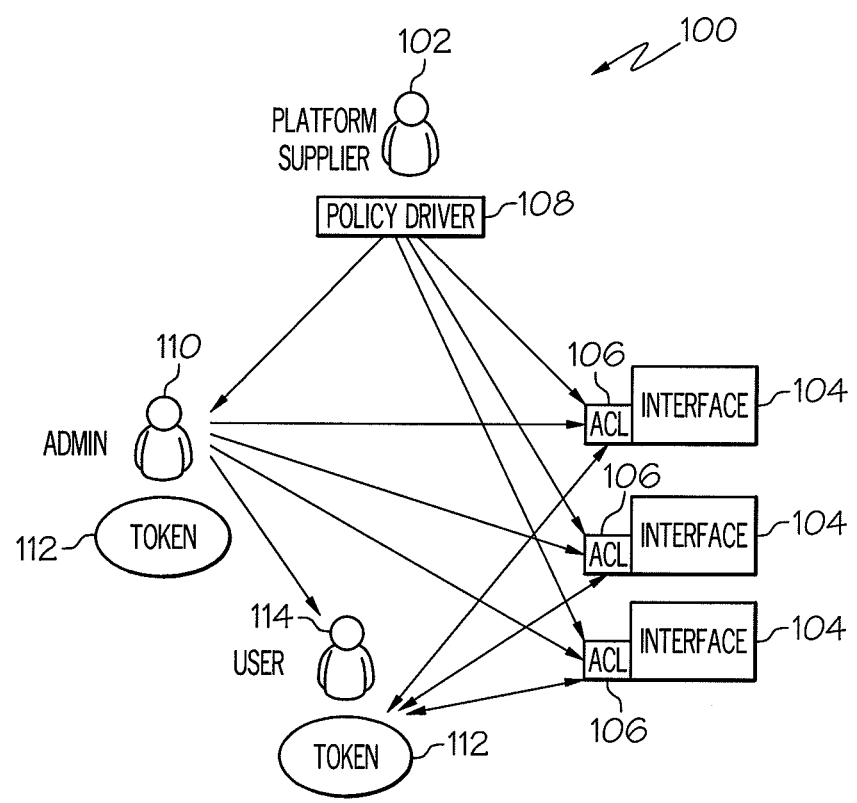
FIG. 1 is a simplified diagram of one embodiment of a system for securing application program interfaces in an Unified Extensible Firmware Interface.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

The "extensibility" of the Unified Extensible Firmware Interface allows platform suppliers, driver authors, and other software suppliers to create application interface programs or protocols to interface with platform devices or other software programs, applications, or drivers. A system 100 for securing such application interface programs or protocols is illustrated in FIG. 1. In the system 100, a platform supplier 102 (or driver author or other software supplier) creates one or more application program interfaces 104. In addition, the platform supplier 102 creates a default access control list 106 for each application program interface 104. As discussed in more detail below, the access control list includes one or more access control entries that define which users may access the application program interface and/or which other application program interfaces or other Unified Extensible Firmware Interface services may call the application program interface. In some embodiments, the access control entries may be embodied as data stored in a database or list, which is retrieved in response to the application program interface being called as discussed in more detail below in regard to FIG. 4.

Figure 2:
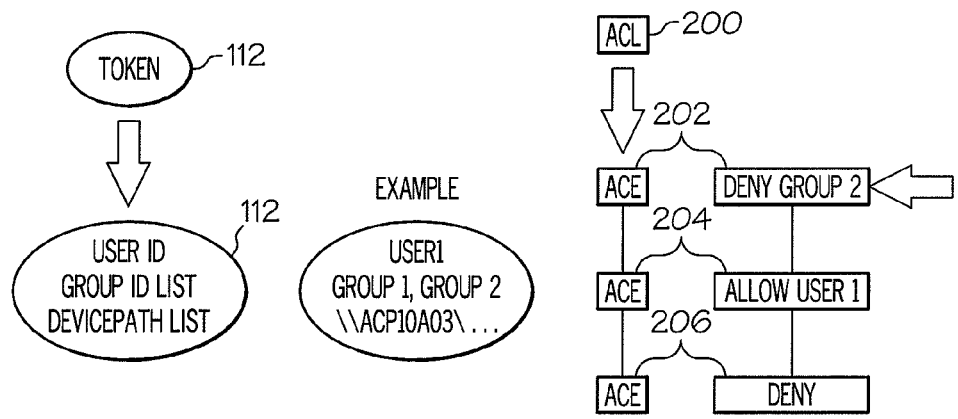
FIG. 2 is a simplified diagram of one embodiment of data structures used in the system of FIG. 1.

The platform supplier 102 also creates a policy driver 108, which may be used by an administrator or other security personnel 110 to update or modify the access control lists 106 associated with each application program interface 104. That is, the administrator 110 may define the access control entries of each access control list. For example, as illustrated in FIG. 2, the administrator 110 may establish an access control entry 202 of an access control list 200 that identifies a particular group of users and whether the group of uses are granted or denied access to the application program interface. Additionally, the administrator 110 may establish an access control entry 204 that identifies a particular user and whether the user is granted or denied access to the application program interface. Further, the administrator 110 may establish an access control entry 206 that defines a default access policy to either grant access or deny access to the application program interface. That is, if no matches are established with the other access control entries of the access control list, the default access policy is returned. For example, in the embodiment illustrated in FIG. 2, a user 2 that does not belong to Group 2 would be denied access to the application program interface because the default access policy defined by the access control entry 206 is to deny access. As such, the administrator 110 may use the policy driver 108 to maintain the access control lists 104 associated with each of the protected application program interfaces 106.

In addition to updating and maintaining the access control lists 104, the administrator creates a user token 112 for each user 114. The user token 112 may be embodied as a data structure that includes data that identifies the user. Additionally, the user token 112 may include other data associated with the user. For example, as illustrated in FIG. 2, the user token 112 may include user identification data, group identification list that defines the groups of users to which the particular user belongs, and a drive path list that defines whether the particular user can set access policy for the application program interface or protocol installed to the defined drive path and its children.

In use, a software hook for each protected application program interface 104 is established. When one of the protected application program interfaces 104 is called by the user 114, the software hook causes the access control list 106 associated with the called application program interface to be retrieved. The token 112 associated with the user 114 is also retrieved and compared to the access control entries of the access control list 106. Additionally, the access control lists of other protected application program interfaces or Unified Extensible Firmware Interface services which are called during the execution of the requested application program interface are accessed and compared to the user token 112. In this way, the least-privilege principal is ensured across the entire call-stack of the requested application program interface such that an unauthorized user cannot effect privilege escalation by invoking an application program interface that calls a successive denied interface or service.

Figure 3:
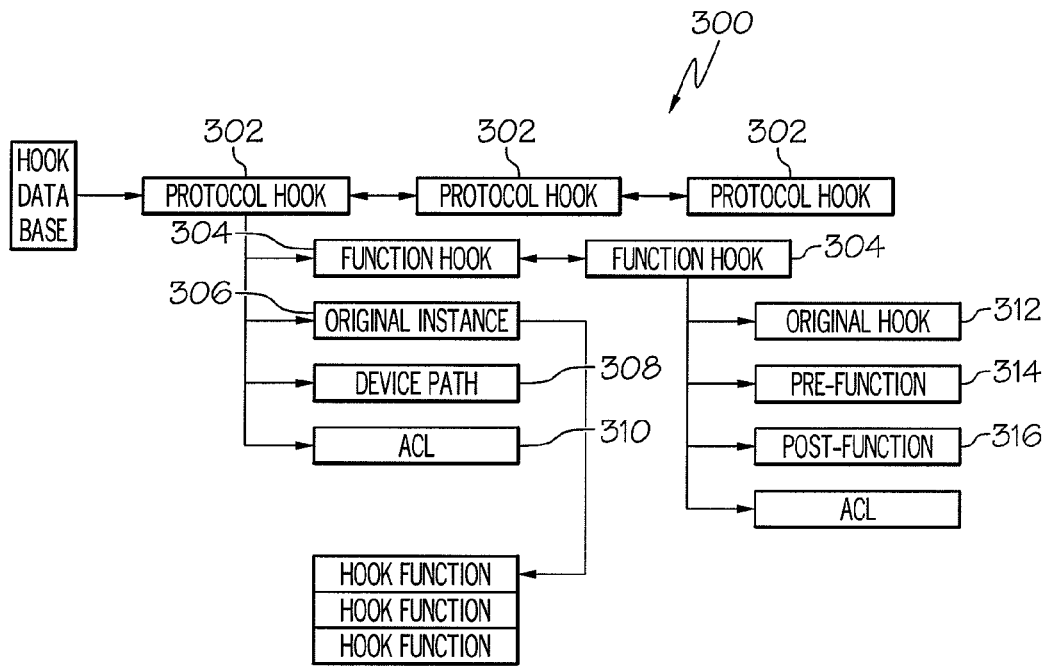
FIG. 3 is a simplified diagram of one embodiment of a hook database structure used in the system of FIG. 1.

Based on the comparison of the access control entries and the user token 112, decision to grant or deny the user 114 access to the called application program interface in made. The software hooks for each of the application program interfaces 104 may be stored in a hook database 300 as illustrated in FIG. 3. The hook database 300 defines a number of hook protocols 302, each of which includes a function hook structure 304, an original instance structure 306, a device path 308, and an associated access control list 310. The function hook structure 304 includes the original called function 312, any pre-functions 314, and any post-functions 316. In this way, the hook protocol can analyze any additional application program interfaces or other services called by the requested application program interface for which the hook protocol is defined.

Figure 4:
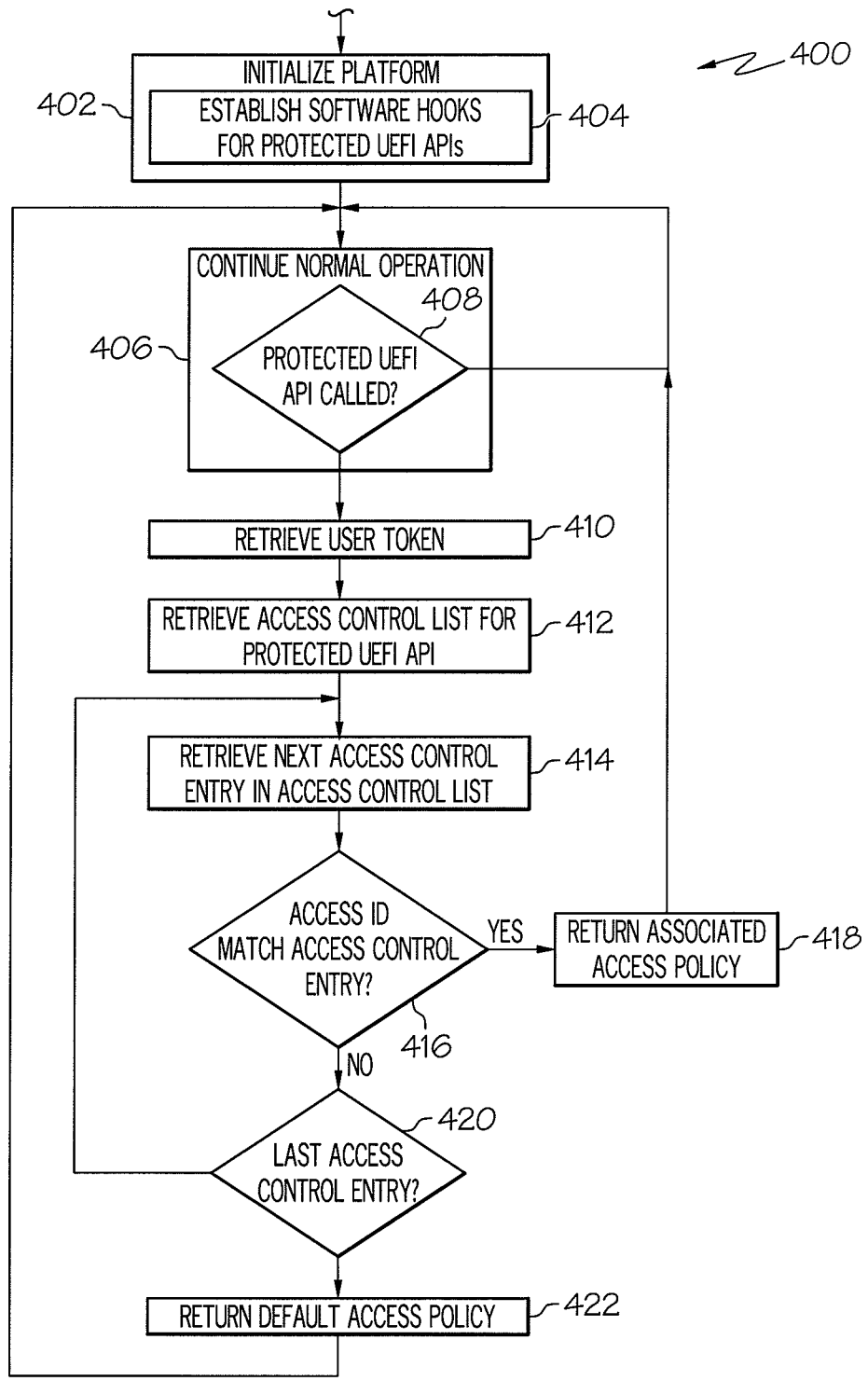
FIG. 4 is a simplified flow diagram of one embodiment of an algorithm for securing application program interfaces an Unified Extensible Firmware Interface.

Referring now to FIG. 4, in use a computing device operated by the user 114 may execute an algorithm or process 400 for securing an Unified Extensible Firmware Interface application program interface. The process 400 begins with block 402 in which the platform of the computing device is initialized. For example, the system memory of the computing device may be initialized in block 402. Additionally, in block 402, the software hooks for each protected Unified Extensible Firmware Interface application program interface or protocol is established in block 404.

Normal pre-boot phase operations are continued in block 406. However, during the pre-boot phase of the computing device, the computing device monitors for the calling of any of the protected Unified Extensible Firmware Interface application program interfaces in block 408 using the software hooks, which were established in block 404. If a protected application program interface is not called or requested, normal pre-boot operations are continued in block 406. However, if it is determined that a protected application program interface has been called, the user token associated with the user of the computing device is retrieved in block 410. Additionally, the access control list for the requested and protected application program interface is retrieved in block 412. The user token and the access control list may be stored in a memory location such as a reserved memory location, in data registers, and/or on a hard drive or other storage device. Although the blocks 410 and 412 are shown in FIG. 4 in a particular sequential order, it should be appreciated that the blocks 410 and 412 may be executed in any order or contemporaneously.

In block 414, the next access control entry of the access control list associated with the requested and protected application program interface is retrieved. As discussed above, the access control entry may be embodied as data that identifies a particular group of users or a particular user and whether the group of users or user is granted or denied access to the application program interface. Additionally, the access control entry may be embodied as a default access policy to either grant access or deny access to the application program interface in the case wherein a match to the user token is not made. In block 416, the access control entry is compared to the user token. As discussed above, the user token may include data identify the user and/or data identifying the groups to which the user belongs. As such, depending upon the type of access control entry, the access control entry may be compared to the data identifying the user and/or to the data of the user token that identifies the groups to which the user belongs.

If a match between the user token and the current access control entry is made in block 416, the associated access policy (i.e., to deny or to grant access to the requested application program) is returned in block 418. However, if a match between the user token and the current access control entry is not made in block 416, it is determined whether the current access control entry is the last control entry of the access control list. If not, the next access control entry is retrieved in block 414 and compared to the user token in block 416. However, if the current access control entry is the last access control entry, the default access policy, which may be to grant or deny access to the requested application program interface, is returned in block 422.

It should be appreciated that the process of blocks 414 and 416 may be repeated recursively in those embodiments in which the requested application program interface is configured to call other protected application program interfaces or services. In this way, the user is restricted from escalating their associated privileges to access application program interfaces that are restricted from them. Additionally, it should be appreciated that although the algorithm 400 has been described above in regard to the pre-boot phase or environment of a computing device, a similar process may be used to protect Unified Extensible Firmware Interface application program interfaces or protocols that are called during runtime (e.g., by being re-invoked in a safe-mode scenario or virtual instance).

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
   establishing, by a computing device, a software hook for an application program interface selected out of a unified extensible firmware interface application program interface and a unified extensible firmware platform initialization interface application program interface on the computing device during a pre-boot phase of the computing device, wherein the software hook defines an access control list associated with the application program interface to be retrieved when the application programming interface is called to determine whether the application programming interface may be accessed; and
   in response to the application programming interface being called by a program:
      retrieving, by the computing device, a user token associated with the program, the user token including data indicative of a device path list that defines whether the user is permitted to set access policy in association with the application program interface and a drive path, including drive paths, if any, that are children of the drive path;
      retrieving, by the computing device, the access control list associated with the application program interface using the established software hook, the access control list including at least one access control entry; and
      granting or denying the program that called the application programming interface access to the application program interface, by the computing device, based on a comparison of the user token and the at least one access control entry.

2. The method of claim 1, wherein the user token includes data indicative of an identity of a user.

3. The method of claim 1, wherein the user token includes data indicative of at least one group to which a user belongs.

4. The method of claim 1, wherein the access control entry includes data that identifies one or more users allowed to access the application program interface.

5. The method of claim 1, wherein the access control entry includes data that identifies a group whose members are allowed to access the application program interface.

6. The method of claim 1, wherein the access control entry comprises a default access policy, the default access policy being one of denial of access to the application program interface and granting of access to the application program interface.

7. The method of claim 1, wherein granting or denying access to the application program interface based on a comparison of the user token and the access control entry comprises comparing data indicative of an identity of a user and the at least one access control entry.

8. The method of claim 1, wherein granting or denying access to the application program interface based on a comparison of the user token and the at least one access control entry comprises comparing data indicative of a group to which a user belongs to and the at least one access control entry.

9. The method of claim 1, further comprising retrieving, by the computing device, an access control list associated with a unified extensible firmware interface service that is to be called by the application program interface.

10. The method of claim 9, further comprising comparing, by the computing device, an access control entry of the access control list associated with the unified extensible firmware interface service to the user token.

11. The method of claim 10, further comprising granting or denying access to the application program interface based on the comparison of the user token and the at least one access control entry of the access control list associated with the unified extensible firmware interface service.

12. A non-transitory machine-readable medium comprising a plurality of instructions, that in response to being executed on a computing device, cause the computing device to perform operations, the operations including:
   establishing a software hook for an application program interface selected out of a unified extensible firmware interface application program interface and a unified extensible firmware platform initialization interface application program interface on the computing device during a pre-boot phase of the computing device, wherein the software hook defines an access control list associated with the application program interface to be retrieved when the application programming interface is called to determine whether the application programming interface may be accessed; and
   in response to the application programming interface being called by a program:
      retrieving a user token associated with the program, the user token including data indicative of an identity of a user and data indicative of a device path list that defines whether the user is permitted to set access policy in association with the application program interface and a drive path, including drive paths, if any, that are children of the drive path;
      retrieving the access control list associated with the application program interface using of the established software hook, the access control list including at least one access control entry that indicates which users are allowed to access the application program interface; and
      granting or denying the program that called the application programming interface access to the application program interface based on a comparison of the data indicative of the identity of the user and the at least one access control entry.

13. The non-transitory machine-readable medium of claim 12, wherein the user token includes data indicative of at least one group to which the user belongs.

14. The non-transitory machine-readable medium of claim 12, wherein the at least one access control entry comprises a default access policy, the default access policy being one of denial of access to the application program interface and granting of access to the application program interface.

15. The non-transitory machine-readable medium of claim 12, further comprising retrieving an access control list associated with a unified extensible firmware interface service that is to be called by the application program interface.

16. The non-transitory machine-readable medium of claim 15, further comprising comparing an access control entry of the access control list associated with the unified extensible firmware interface service to the user token.

17. The non-transitory machine-readable medium of claim 16, further comprising granting or denying access to the application program interface based on the comparison of the user token and access control entry of the access control list associated with the unified extensible firmware interface service.

18. A computing device comprising:
a processor; and
a memory device having stored therein a plurality of instructions, which, in response to execution by the processor, cause the processor to:
  establish a software hook for an application program interface selected out of a unified extensible firmware interface application program interface and a unified extensible firmware platform initialization interface application program interface on the computing device during a pre-boot phase of the computing device, wherein the software hook defines an access control list associated with the application program interface to be retrieved when the application programming interface is called to determine whether the application programming interface may be accessed; and
  in response to the application programming interface being called by a program:
    retrieve a user token associated with the program, the user token including data indicative of an identity of a user and data indicative of a device path list that defines whether the user is permitted to set access policy in association with the application interface and a drive path, including drive paths, if any, that are children of the drive path;
    retrieving the access control list associated with the application program interface using the established software hook, the access control list including at least one access control entry that indicates which users are allowed to access the application program interface; and
    granting or denying the program that called the application programming interface access to the application program interface based on a comparison of the data indicative of the identity of the user and the at least one access control entry.

* * * * *